June 25, 1940.  J. LEDWINKA  2,205,797

VEHICLE BODY STRUCTURE AND METHOD OF ASSEMBLY

Original Filed Aug. 3, 1935

INVENTOR.
JOSEPH LEDWINKA.
BY
ATTORNEY.

Patented June 25, 1940

2,205,797

UNITED STATES PATENT OFFICE 2,205,797

VEHICLE BODY STRUCTURE AND METHOD OF ASSEMBLY

Joseph Ledwinka, Philadelphia, Pa., assignor to Edward G. Budd Manufacturing Company, Philadelphia, Pa., a corporation of Pennsylvania Application August 3, 1935, Serial No. 34,555
Renewed November 15, 1937

6 Claims. (Cl. 296—137)

The invention relates to vehicle bodies and particularly to vehicle bodies fabricated out of side and roof sub-assemblies extending through a substantial portion of the length of the complete body.

The invention is particularly applicable to the fabrication of bodies in the manner disclosed in the copending application Serial No. 34,493 filed of even date herewith, and has for its object an improved method of assembly of the side wall and roof unit sub-assembly and an improved construction of the final assembly joint between these parts.

It is a particular object of the invention to facilitate the final assembly and to improve the appearance of the final assembly joint.

I attain this object in large part by making the drip channel a part of the side wall sub-assembly, and by flanging the lower side edges of the roof panel sub-assembly outwardly and seating these outwardly flanged edges in lapped relation to the bottom wall of the drip channels and securing them thereto in said relation. This construction permits the roof and side sub-assemblies to be joined very readily by a line of spot welds, which can be quickly and easily made by the use of a pair of pinch welders moved in a line along the joint. To permit the joint to be made readily in this way and at the same time improve the appearance, the outer wall of the drip channels is preferably inclined inwardly and upwardly and given any desired curved configuration until its upper edge lies in close proximity to the roof. To facilitate the final assembly with the drip channel wall so inclined in the final joint, I preferably leave the outer wall in a preliminary position making a greater angle with the bottom wall than its final position, and bring it to final position only after the roof panel has been secured in assembled relation with the bottom of the drip channel.

Other and further objects and advantages will become apparent from the following detailed description when read in connection with the drawing forming a part hereof.

Figure 1:
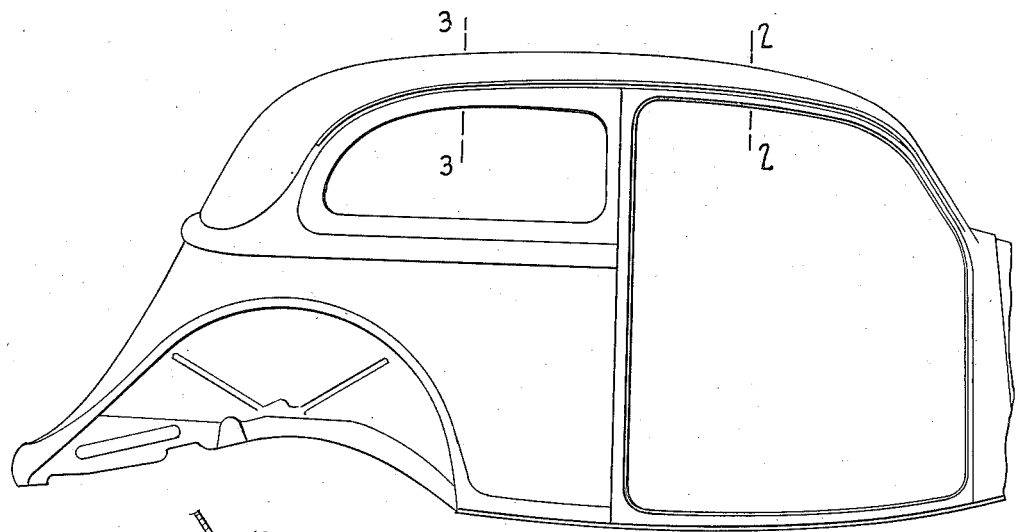
Fig. 1 shows a side elevation of a vehicle body constructed according to the invention.

In the drawing, the invention is shown applied to a sedan type of body having a door and window opening in its side walls, but it will be understood that it is applicable to any closed type of body.

Figure 2:
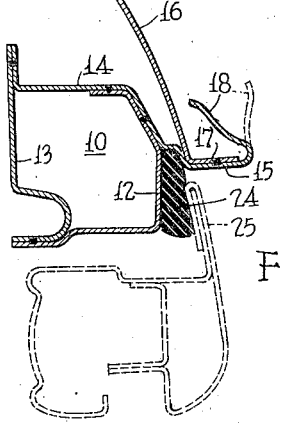
Fig. 2 is a transverse vertical sectional view through the side header at the top of a doorway opening taken substantially on the line 2—2.

In the present embodiment of the invention the side wall of the body is built up as a separate unitary sub-assembly and similarly the roof panel forms a separate sub-assembly, each capable of being handled and shipped as a unit to the place of final assembly. As shown in Figs. 1 and 2, each side sub-assembly comprises a box section header 10 extending above the door and window openings, this header being in the form shown, built up of an outer panel 12, an inner panel 13 and a top member 14, all secured together as by welding, in their overlapping margins to form a strong box section structure. The top member 14 is extended outwardly beyond the box section header structure by an integral marginal formation forming an upwardly presenting drip channel 15.

The roof panel sub-assembly may comprise a unitary stamping 16 extending from side to side and curved downwardly in its lateral portions to have its outwardly extending edge flange 17 seat in overlapping relation on the bottom wall of the drip channel 15, to which it is secured by a line of spot welds. The outer wall 18 of the drip channel may be given an ornamental curved configuration in section but is shown as extending upwardly and inwardly with its upper edge turned inwardly and located in close proximity to the roof panel 16. So formed and located, it adds materially to the appearance of the body, since it simulates an ornamental bead extending over the door and window openings.

To facilitate the final assembly of the roof, the outer wall of the drip channel is, prior to said assembly, left projecting upwardly as indicated in dotted lines and making a greater angle with the bottom wall of the drip channel than in its final position, as shown in full lines. Thus the mouth of the channel is very much widened, and the flanged margin of the roof can be readily brought down into its seated relation on the bottom of the channel and secured thereto. After the roof panel has been assembled the outer wall 18 of the channel is turned inwardly to its final position, as described above.

Figure 4:
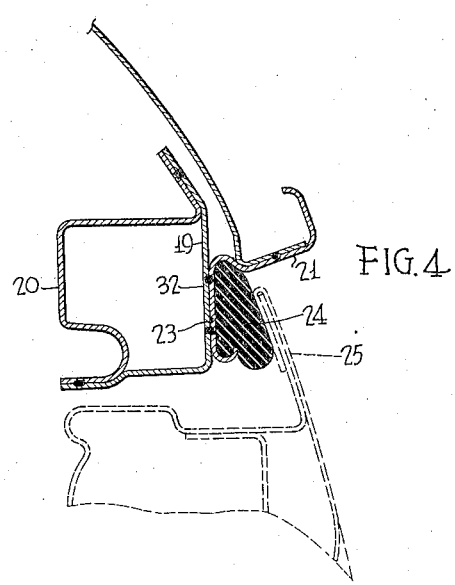
Fig. 4 is a view similar to Fig. 2 of a slight modification of the invention.
Figure 3:
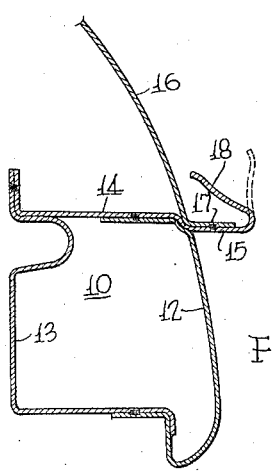
Fig. 3 is a similar view taken through the header at the top of a window opening substantially on the line 3—3 of Fig. 1.

According to the modification shown in Fig. 4, the assembly steps are very similar to those already described. In this construction the hollow box section header is shown built up by outer and inner panel stampings 19 and 20 secured together through their overlapping edge flanges, as by line spot welding. Prior to the assembly of the outer and inner stamping the combined drip channel and weatherstrip holding strip 21 is spot welded to the outer face of the stamping 19 above the door openings through its downwardly extending weatherstrip holding portion 32 and above the window openings through a securing flange (not shown) turned upwardly instead of downwardly as in the region above the door opening. In the form shown in Fig. 4, the outer wall 23 of the drip channel, while extending upwardly and inwardly does not interfere with the seating of the flanged roof panel on the bottom of the channel and may be given its final angle with the bottom prior to the assembly and securement of the roof panel sub-assembly.

In both forms of the invention, a rubber weatherstrip 24 is located directly below the drip channel. In the form shown in Fig. 2 it is secured in place by a suitable adhesive and in the form shown in Fig. 4 it is additionally held in place by the outwardly facing channel 23 having a restricted opening between the inwardly inclined sides of the channel. The edge of the door indicated at 25, in both forms, closes against the weatherstrip 24 to form a weather seal at the top of the door.

While I have hereinbefore described several specific embodiments of the invention it will be understood that changes and modifications may be made which fall within the purview of one skilled in the art and such changes and modifications are intended to be covered by the appended claims.

What I claim is:

1. In a vehicle body, an assembly of roof structure and a box-section header suitable for use along the upper margin of the substantially vertical body wall, which assembly comprises a flange associated with and extending laterally and outwardly beyond the outer wall of said box section header, said flange having at its outer edge an upstanding flange constituting the outer side wall of a drip channel, and a rigid roof panel having at its marginal edge an outwardly extending flange, said roof having its main body spaced from said header and only its marginal flange brought down and secured to the upper surface of said outwardly extending flange of said header.

2. In a vehicle body, an assembly of roof structure and a box-section header according to claim 1, which assembly comprises one wall only of the box-section header being integrally extended laterally and outwardly beyond the header, the extended wall portion forming said flange for fastening said roof panel to said header.

3. In a vehicle body, an assembly of roof structure and a box-section header according to claim 1, said flange associated with said header forming one arm of a member angle-shaped in cross-section, the other arm of which extending downwardly and being fastened to the outer wall of the header and being formed so as to receive a weatherstrip.

4. In a vehicle body comprising a header along the upper margin of a substantially vertical body wall, said header being provided with an upwardly and inwardly opening angle-section member forming a drip channel, and a roof panel having at its marginal edge an outwardly extending flange, the method of securing the inner face of said roof flange to the bottom wall of said drip channel and thereafter bending inwardly the outer wall of the drip channel in overcoming the elastic limit of the material along the bending line so that without the aid of additional retaining means the space between the roof panel and the upper edge of the outer wall of the drip channel becomes and remains less than the widths of the outwardly extending flange of the roof panel.

5. In a vehicle body, a drip channel comprising a bottom wall and integral therewith an outer wall, a panel forming a portion of the outer shell of the body, said panel being provided with an outwardly bent off marginal flange, said marginal flange overlapping and being fastened to the inner surface of the bottom wall of said drip channel, said bottom wall and said marginal flange being inclined in cross section with their outer margin in a direction toward the opening of the channel.

6. In a vehicle body comprising a drip channel and an adjoining panel forming a portion of the outer shell of the body, the bottom wall and the outer wall of said drip channel being integrally formed from one strip of material; said adjoining panel being fastened to the bottom wall of said drip channel, the upper margin of said outer wall of the drip channel being inwardly curved so as to conceal its sharp free edge and to conceal from view the edge of the adjoining panel situated at and fastened to said bottom wall of the drip channel.

JOSEPH LEDWINKA.